United States Patent
Ng et al.

(10) Patent No.: US 11,057,395 B2
(45) Date of Patent: Jul. 6, 2021

(54) MONITORING FOR AUTHENTICATION INFORMATION

(71) Applicant: HEWLETT PACKARD ENTERPRISE DEVELOPMENT LP, Houston, TX (US)

(72) Inventors: Ming Sum Sam Ng, Hong Kong (CN); Ronald Joseph Sechman, Alpharetta, GA (US); Matias Madou, Diegem (BE)

(73) Assignee: Micro Focus LLC, Santa Clara, CA (US)

( * ) Notice: Subject to any disclaimer, the term of this patent is extended or adjusted under 35 U.S.C. 154(b) by 771 days.

(21) Appl. No.: 15/128,501

(22) PCT Filed: Mar. 24, 2014

(86) PCT No.: PCT/US2014/031569
§ 371 (c)(1),
(2) Date: Sep. 23, 2016

(87) PCT Pub. No.: WO2015/147779
PCT Pub. Date: Oct. 1, 2015

(65) Prior Publication Data
US 2017/0111370 A1    Apr. 20, 2017

(51) Int. Cl.
| | |
|---|---|
| *H04L 29/06* | (2006.01) |
| *G06F 21/57* | (2013.01) |
| *G06F 21/31* | (2013.01) |
| *G06F 21/41* | (2013.01) |
| *G06F 21/10* | (2013.01) |

(Continued)

(52) U.S. Cl.
CPC .............. *H04L 63/12* (2013.01); *G06F 21/10* (2013.01); *G06F 21/31* (2013.01); *G06F 21/41* (2013.01); *G06F 21/577* (2013.01); *H04L 63/08* (2013.01); *H04L 63/0815* (2013.01); *H04L 63/10* (2013.01); *H04L 43/08* (2013.01);
(Continued)

(58) Field of Classification Search
CPC ..... H04L 63/08; H04L 63/10; H04L 63/0815; H04L 63/12; G06F 21/10; G06F 21/41; G06F 21/31
See application file for complete search history.

(56) References Cited

U.S. PATENT DOCUMENTS

| | | | |
|---|---|---|---|
| 7,194,761 B1 * | 3/2007 | Champagne | ............ G06F 21/31 709/232 |
| 7,475,146 B2 * | 1/2009 | Bazot | ...................... G06F 21/41 709/227 |

(Continued)

FOREIGN PATENT DOCUMENTS

| | | |
|---|---|---|
| CN | 101662364 A | 3/2010 |
| CN | 102638454 A | 8/2012 |

OTHER PUBLICATIONS

Gouveia, Joao, et al. "E-id authentication and uniform access to cloud storage service providers." 2013 IEEE 5th International Conference on Cloud Computing Technology and Science. vol. 1. IEEE, 2013, pp. 487-492. (Year: 2013).*

(Continued)

*Primary Examiner* — Kari L Schmidt (57) ABSTRACT

Information stored in a Hypertext Transfer Protocol (HTTP) session is monitored. Based on the monitoring, authentication information in the information stored in the HTTP session is identified.

19 Claims, 4 Drawing Sheets

(51) Int. Cl.
  *H04L 29/08* (2006.01)
  *H04L 12/26* (2006.01)
  *H04L 29/12* (2006.01)
(52) U.S. Cl.
  CPC ........ *H04L 61/2007* (2013.01); *H04L 63/168* (2013.01); *H04L 67/02* (2013.01); *H04L 67/146* (2013.01)

(56) References Cited

U.S. PATENT DOCUMENTS

| | | | | |
|---|---|---|---|---|
| 7,478,434 | B1* | 1/2009 | Hinton | G06F 17/3089 726/27 |
| 8,065,390 | B2 | 11/2011 | Cheng | |
| 8,392,977 | B2* | 3/2013 | He | H04L 12/4641 709/224 |
| 8,543,973 | B2 | 9/2013 | Nguyen et al. | |
| 8,671,444 | B2* | 3/2014 | Kulkarni | H04L 63/18 726/9 |
| 9,088,564 | B1* | 7/2015 | Hobson | H04L 63/083 |
| 9,204,345 | B1* | 12/2015 | Roskind | H04L 63/101 |
| 9,794,239 | B1* | 10/2017 | Chaudhry | G06F 21/31 |
| 10,659,446 | B2* | 5/2020 | Alexander | H04L 63/08 |
| 10,924,278 | B2* | 2/2021 | McGough | H04L 9/0822 |
| 2002/0091798 | A1* | 7/2002 | Joshi | G06F 17/30867 709/219 |
| 2003/0014500 | A1* | 1/2003 | Schleiss | G05B 19/4185 709/218 |
| 2003/0200465 | A1* | 10/2003 | Bhat | H04L 63/0815 726/8 |
| 2004/0143669 | A1* | 7/2004 | Zhao | H04L 29/06 709/228 |
| 2005/0198204 | A1* | 9/2005 | Takahashi | G06F 21/6218 709/219 |
| 2007/0011303 | A1* | 1/2007 | Hatakeyama | H04L 63/08 709/224 |
| 2007/0124806 | A1 | 5/2007 | Shulman et al. | |
| 2008/0141352 | A1* | 6/2008 | Lindsley | H04L 63/083 726/6 |
| 2008/0263650 | A1 | 10/2008 | Kerschbaum | |
| 2008/0263652 | A1 | 10/2008 | McMurtry et al. | |
| 2009/0052675 | A1* | 2/2009 | Levow | H04L 63/06 380/278 |
| 2011/0159848 | A1* | 6/2011 | Pei | G06F 21/42 455/411 |
| 2012/0023558 | A1 | 1/2012 | Rafiq | |
| 2013/0246528 | A1 | 9/2013 | Ogura | |
| 2014/0006562 | A1 | 1/2014 | Handa et al. | |
| 2016/0337333 | A1* | 11/2016 | Rollet | H04L 63/083 |
| 2017/0099280 | A1* | 4/2017 | Goel | H04L 63/168 |
| 2019/0075168 | A1* | 3/2019 | Goldfarb | H04L 63/0272 |
| 2019/0166129 | A1* | 5/2019 | Gaetjen | H04L 9/3236 |
| 2020/0021659 | A1* | 1/2020 | Yamada | H04L 67/02 |
| 2020/0067914 | A1* | 2/2020 | Glozman | H04L 9/3215 |

OTHER PUBLICATIONS

Basney, Jim, and Jeff Gaynor. "An OAuth service for issuing certificates to science gateways for TeraGrid users." Proceedings of the 2011 TeraGrid Conference: Extreme Digital Discovery. 2011, pp. 1-6. (Year: 2011).*

J. Novotny, S. Tuecke and V. Welch, "An online credential repository for the Grid: MyProxy," Proceedings 10th IEEE International Symposium on High Performance Distributed Computing, San Francisco, CA, USA, 2001, pp. 104-111. (Year: 2001).*

Admin-Zenconsult, "Custom Authentication with Google Cloud Endpoints Using App Engine Java," Jul. 26, 2013, pp. 1-7, Available at: <web.archive.org/web/20130907100816/http://chirashi.zenconsult.net/2013/07/custom-authentication-with-google-cloud-endpoints-using-app-engine-java/>.

International Search Report and Written Opinion, International Application No. PCT/US2014/031569, dated Dec. 5, 2014, pp. 1-11, KIPO.

StackOverflow, "How to Track Login Attempts Using Httpsession in Java?," Dec. 4, 2012, pp. 1-6, Available at: <stackoverflow.com/questions/13694239/how-to-track-login-attempts-using-httpsession-in-java>.

* cited by examiner

MONITORING FOR AUTHENTICATION INFORMATION

BACKGROUND

Electronic devices are able to access resources in a system, where the system can include one or multiple networks over which the resources are accessible. Examples of resources include executable applications (e.g. web application or other types of applications), storage resources, processing resources, communication resources, and so forth.

BRIEF DESCRIPTION OF THE DRAWINGS

Some implementations are described with respect to the following figures.

DETAILED DESCRIPTION

It may be desirable to monitor events relating to access of resources in the system. As part of such monitoring, information can be collected for detected events, and such information can be logged or analyzed.

Monitoring agents can be provided in a system (such as a system including resources that are accessible over a network or multiple networks), to monitor for and collect information relating to events associated with access or execution of the resources. A monitoring agent can be implemented as machine-readable instructions that are executable to perform monitoring tasks. Alternatively, a monitoring agent can be a hardware-based device configured to perform monitoring tasks.

In some examples, resources can include applications (such as web applications or other types of machine-readable instructions) that are executable in computers. An application when executed can provide a service (or services) to a requester (e.g. a user or a machine) that invoked the application. A web application is an application that can run in a web browser or in response to a request submitted through a web browser.

In other examples, a system can include additional types of resources that can be accessed, such as a storage resource for storing data (e.g. a storage device such as a disk-based storage device or solid state storage device), a processing resource that is able to perform a processing task by executing machine-readable instructions (e.g. a microprocessor, a microcontroller, an application-specific integrated circuit, a programmable gate array, etc.), a communication component used for performing communications (e.g. a router, a switch, etc.), and/or other resources.

Information collected relating to events monitored by a monitoring agent can be logged and/or reported to an analysis system, which can apply a specified analysis on the collected information. For example, the analysis that can be performed can be an analysis to identify any security vulnerabilities in the system. Another example analysis that can be performed is to determine whether a system is compliant with rules, regulations, policies, and so forth.

Traditionally, a monitoring agent monitors for events by monitoring known application programming interfaces (APIs) provided by web applications or other resources. However, there may be events in a system associated with access or execution of resources that may be associated with custom APIs that are not known to the monitoring agent. Examples of such events include authentication events, which are events relating to performing authentication of users or other entities (such as electronic devices, applications, and so forth). If the API for authentication events is not known to the monitoring agent, then the monitoring agent would not be able to monitor for and collect information relating to authentication events.

Although custom rules can be provided to allow for a monitoring agent to detect authentication events associated with a custom API, generating such rules may be challenging. For example, a user would have to have a relatively good understanding of the resource (e.g. web application) associated with the custom API to be able to come up with rules that can be applied for monitoring authentication events. Moreover, even if a user has a good understanding of the resource, the process of producing rules for monitoring authentication events may be tedious, error-prone, and time consuming.

In accordance with some implementations, a monitoring agent is provided that is able to monitor for authentication events of resources for which a programming interface (such as an API) to such a resource is not known to a monitoring agent. In some implementations, the monitoring agent is configured to monitor stored information of a Hypertext Transfer Protocol (HTTP) session to identify authentication information such that the monitoring agent is able to determine whether an authentication attempt by a client (e.g. a user or machine) is successful or unsuccessful. An authentication attempt can be performed as part of a logon procedure to log into a resource (e.g. web application or other type of resource).

An authentication attempt is considered to be successful if the client submitted correct credentials with the authentication attempt. Examples of credentials include an identifier of the client (e.g. username or other type of identifier) and a passcode (e.g. user-entered password, security key, etc.).

An authentication attempt is considered to be unsuccessful if the client did not submit correct credentials with the authentication attempt.

Successful and unsuccessful authentication attempts are examples of events that can be monitored for by the monitoring agent according to some implementations. Other authentication events that can be monitored by the monitoring agent include a logoff event, where a client logs off from the web application or another resource, or any other event that is associated with verifying that a client is authorized to perform a requested action.

HTTP is a protocol used for communications over a network, such as the Internet. HTTP is a request-response protocol in which an HTTP request can be submitted by a client to a server, and the server can respond with an HTTP response. An HTTP session is a sequence of HTTP request-response transactions.

An HTTP session can be associated with an HTTP session API, which can include various API routines that can be invoked to read or store information of an HTTP session. A monitoring agent according to some implementations is able to monitor an HTTP session API (or other interface to the HTTP session) to detect authentication events.

A storage of an HTTP session refers to a data structure associated with the HTTP session that is used to contain data relating to the HTTP session. In the ensuing discussion, a storage of an HTTP session is referred to as an HTTP session storage.

An HTTP session can include various attributes. In some examples, one of the attributes stores account information, where the account information (also referred to as an account object) can include authentication information such as a username, a password, or other credentials. Other example attributes of an HTTP session include one or some combination of the following: an elapsed time attribute to track an elapsed time of the HTTP session, a language attribute that identifies the language of the HTTP session, an attribute for indicating whether or not information regarding the HTTP session is to be stored after a user has logged off from the HTTP session, and so forth.

Figure 1:
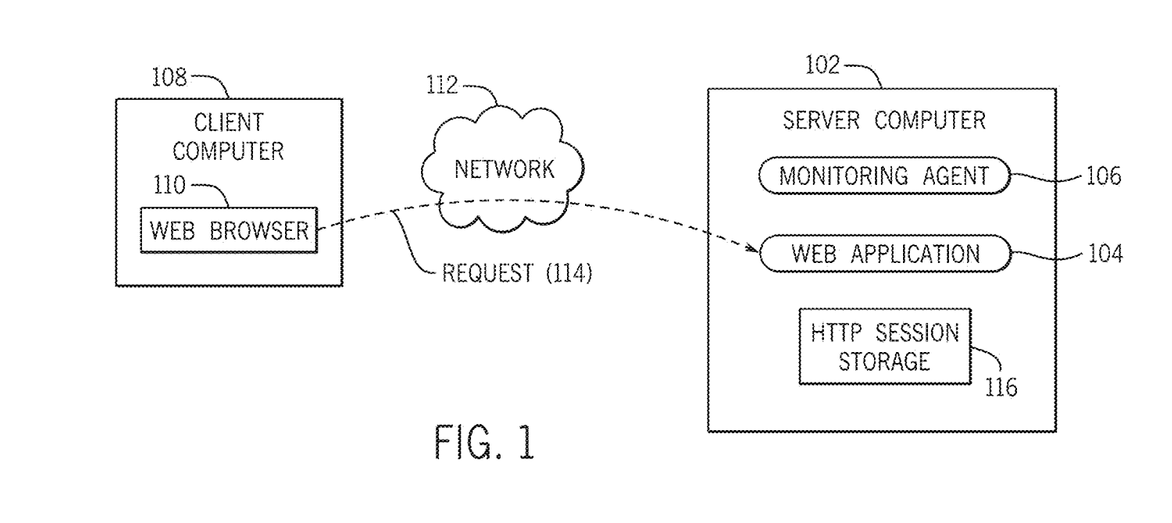
FIG. 1 is a block diagram of an example arrangement that includes a monitoring agent according to some implementations.

FIG. 1 is a block diagram of an example arrangement according to some implementations. The arrangement of FIG. 1 includes a server computer in which a web application 104 is executable. In addition, a monitoring agent 106 is also executable in the server computer 102. Although the monitoring agent 106 is depicted as being separate from the web application 104, it is noted that the monitoring agent 106 can alternatively be part of the web application 104. Alternatively, it is noted that the monitoring agent 106 can be executed on a computer that is separate from the server computer 102.

The monitoring agent 106 can be implemented as machine-readable instructions, such as using JAVA®, MICROSOFT®.NET, or another programming language. In other examples, the monitoring agent 106 can be implemented in hardware, such as with a microcontroller, application-specific integrated circuit (ASIC) device, a programmable gate array (PGA), and so forth.

In the ensuing discussion, reference is made to web applications. Note, however, that techniques or mechanisms according to some implementations can also be applied for monitoring events associated with other types of resources.

The arrangement of FIG. 1 also includes a client computer 108, in which a web browser 110 is executable. In some examples, the client computer 108 can be a notebook computer, a desktop computer, a smart phone, a game appliance, a set-top box, a personal digital assistant, and so forth.

The web browser 110 can be used by a user to access the web application 104 at the server computer 102. Communication between the client computer 108 and the server computer 102 is performed over a network 112.

Although just one client computer 108 and one server computer 102 is depicted in FIG. 1, it is noted that in other examples, multiple client computers and/or multiple server computers may be present.

As depicted in FIG. 1, in response to user input at the client computer 108, the web browser 110 can issue a request 114 to the web application 104 on the server computer 102. In some examples, the request 114 can be an authentication request, such as a request to log onto the web application 104. An example of a uniform resource locator (URL) of an authentication request is set forth below:

URL:/logon.jsp username=admin password=secret

The foregoing example URL includes a "logon" string, which indicates that the request is an authentication request to log onto the web application 104. The example URL also includes credentials for performing an authentication requested by the authentication request. The example credentials include a username (set to value "admin") and a password (set to value "secret").

The request 114 that is submitted by the web browser 110 to the web application 104 can be an HTTP request. In response to an HTTP request, the web application 104 can provide an HTTP response. As noted above, a sequence of HTTP requests and responses are part of an HTTP session.

The HTTP session is associated with an HTTP session storage 116, which is stored in a storage medium (not shown in FIG. 1) that is part of or coupled to the server computer 102. The HTTP session storage 116 can store various HTTP session attributes as discussed above.

Figure 2:
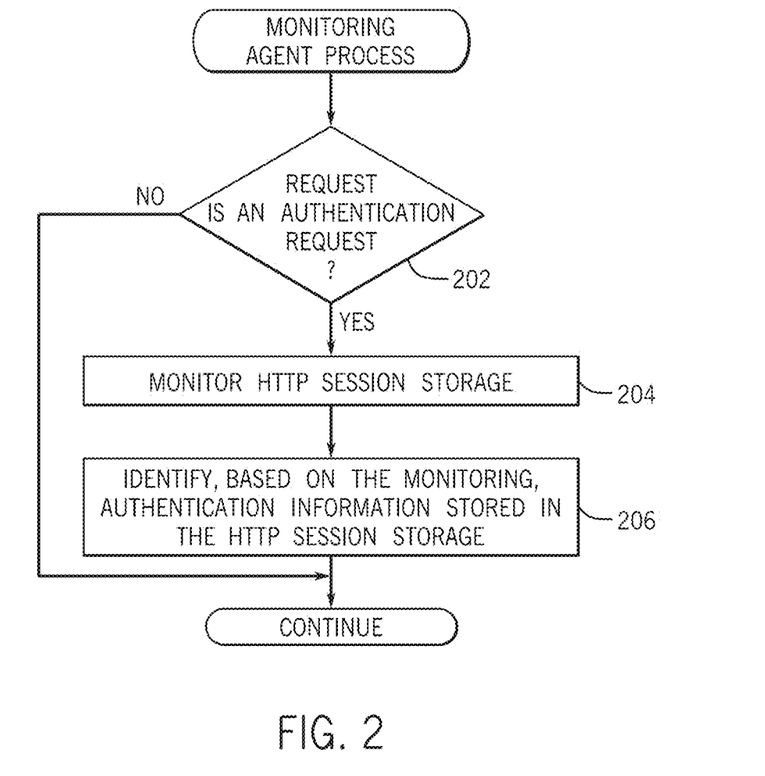
FIG. 2 is a flow diagram of a process for monitoring for authentication information according to some implementations.

FIG. 2 is a flow diagram of a process performed by the monitoring agent 106, in accordance with some implementations. The monitoring agent 106 is able to monitor communications between the web browser 110 and the web application 104. When the monitoring agent 106 detects the request 114 (an HTTP request), the monitoring agent 106 determines (at 202) whether or not the request 114 is an authentication request. This determination is based on checking for specific one or multiple strings in the URL of the request 114, as discussed further below.

In response to determining that the request 114 is an authentication request, the monitoring agent 106 monitors (at 204) the HTTP session storage 116. The monitoring agent 106 identifies (at 206), based on the monitoring, authentication information in the HTTP session storage 116. Detection of such authentication information in the HTTP session storage 116 is an indication that the authentication attempt requested by the authentication request 114 is successful. However, if the monitoring of the HTTP session storage 116 reveals that authentication information has not been stored into the HTTP session storage 116 for the authentication request 114, then that is an indication that the authentication attempt has failed.

In response to determining (at 202) that the request 114 is not an authentication request, the monitoring agent 106 does not perform the HTTP session monitoring.

To determine whether the request 114 is an authentication request, the monitoring agent 106 checks the request, such as the URL of the request, for presence of specified strings. A "string" refers to some combination of alphabet letters, numbers, and symbols. For example, presence of any or a combination of the following strings is an indication that a request is an authentication request: login, logon, signin, signon, authenticate, authentication, SecurityCheck, SecurityAction, and so forth.

Any or some combination of the foregoing strings (referred to as "specified strings") makes up a pattern that the monitoring agent 106 can check for to determine whether a request is likely an authentication request.

In some implementations, the determination of whether or not a request is an authentication request does not end with just a detection of presence of any or some combination of the specified strings. The determination proceeds to further check whether or not credential(s), such as a username and/or password, is (are) included in the URL of the request to make the determination.

The URL of an authentication request can include credential parameters, such as a password parameter, a username parameter, and/or other credential parameter. In some examples, an HTTP password parameter can end with or otherwise contain "password." An example of an HTTP password parameter is as follows: "app1.password." In the foregoing example, the prefix that precedes "password" is "app1," where "app1" identifies a particular web application. If such prefix is present, then it is likely that an HTTP username password would also be preceded by the same prefix, such as "app1.username."

Note that, in some examples, an HTTP username parameter can end with or otherwise contain any of the following: logon, login, user, account, id, name, and so forth.

If the monitoring agent 106 determines that the request is likely an authentication request, based on presence of one or some combination of the specified strings, then the monitoring agent 106 can perform a broad search to identify credential(s), such as a username and password, in the request. This broad search can check for presence of the strings "password," "username," or any other strings that are indicative of presence of a credential, such as "passwd," "logon," "login," "user," "account," "id," "name," and so forth. The other strings searched for in the broad search can include strings not previously identified as corresponding to a username or password.

However, if the monitoring agent 106 determines that the request is unlikely to be an authentication request (due to absence of the specified strings), then the monitoring agent 106 can perform an exact search, to look for specific credential strings, such as "username," "password," and so forth.

The broad search can be a probabilistic search that takes statistical probability into consideration, in which a probability rating is calculated based on the popularity of a detected string. The probability rating of the string is calculated based on data collected from other sources, such as other web sites. A string with a higher probability rating can be selected in the probabilistic search as corresponding to a credential such as a username or password. For example, if both strings "name" and "login id" are present in a URL of the request, then the one with the higher probability rating is selected as the username parameter. If both strings have the same probability rating, then one of the strings can be randomly selected for consideration.

The following illustrates an example program code to store credential information (e.g. username and password) in an HTTP session:

String username=request.getParameter("username");
String password=request.getParameter("password");
Account account=AccountMgr.getAccount(username, password);
request.getSession( ).setAttribute("account", account).

In the example program code above, the request.getParameter( ) routine, and request.getSession( ).setAttribute( ) routine are part of an API of an HTTP session. The request.getParameter( )routine is used to retrieve an HTTP request parameter, such as "username" and "password" above. The AccountMgr.getAccount( ) routine is used to verify the username and password and returns an "account" object if the credential is correct. The request.getSession( ).setAttribute( ) routine is used to store the account object into the HTTP session storage (e.g. 116 in FIG. 1) of the HTTP session.

The monitoring of the HTTP session storage performed at 204 in FIG. 2 can be performed by monitoring an HTTP session API. For example, the monitoring by the monitoring agent 106 can include monitoring for invocation of the request.getSession( ).setAttribute( ) routine, which stores the "account" object into the HTTP session storage. The identifying of the authentication information at 206 in FIG. 2 can include obtaining the "account" object stored by the request.getSession( ).setAttribute( ) routine to retrieve the "username" and "password" parameter, for example.

The following describes how a successful authentication attempt is detected.

If a detected HTTP request (e.g. 114 in FIG. 1) is an authentication request, then the monitoring agent 106 can start monitoring the HTTP session storage, such as by monitoring the request.getSession( ).setAttribute(name, value) routine. Upon completion of the HTTP request processing, the monitoring agent 106 can inspect newly added objects (added to the HTTP session storage) to determine if the newly added objects include a credential parameter (e.g. username parameter, password parameter, etc.). If the newly added object is a string, this determination is performed by a simple string comparison; otherwise, if the newly added object is a more complex object, then a recursive read can be applied to inspect all fields and sub-fields of the object to identify the credential parameter.

Figure 3:
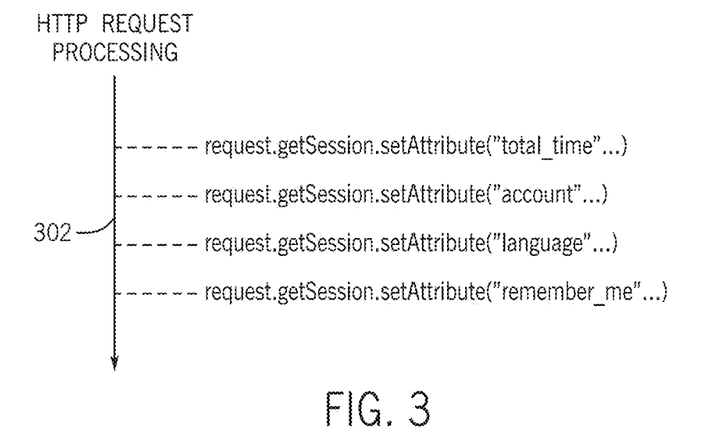
FIG. 3 is a schematic diagram of invocations of routines to store objects in a Hypertext Transfer Protocol (HTTP) session, according to some examples.

FIG. 3 shows an example of objects that may be added by the request.getSession( ).setAttribute( ) routine during HTTP request processing. The arrow 302 represents a timeline from the start of the HTTP request processing to the completion of the HTTP request processing. During the HTTP request processing, the request.getSession( ).setAttribute( ) routine can be invoked multiple times to store different objects into the HTTP session storage, including a "total_time" object (that contains an elapsed time of the HTTP session, an "account" object, a "language" object (that contains information identifying the language of the HTTP session), and a "remember_me" object (containing information for indicating whether or not information regarding the HTTP session is to be stored after a user has logged off from the HTTP session).

To improve performance, the monitoring agent 106 can rank the newly added objects depicted in FIG. 3, where the ranking is based on which of the newly added objects contain credential information. The monitoring agent 106 can then inspect the higher ranked objects first (e.g. the "account" object can be ranked highest and can be inspected first).

In other implementations, ranking of the newly added objects is not performed; instead, the newly added objects are inspected as they are detected.

Once a credential parameter is found in an object, such as the "account" object, the monitoring agent 106 can conclude that a successful authentication request is detected.

Figure 4:
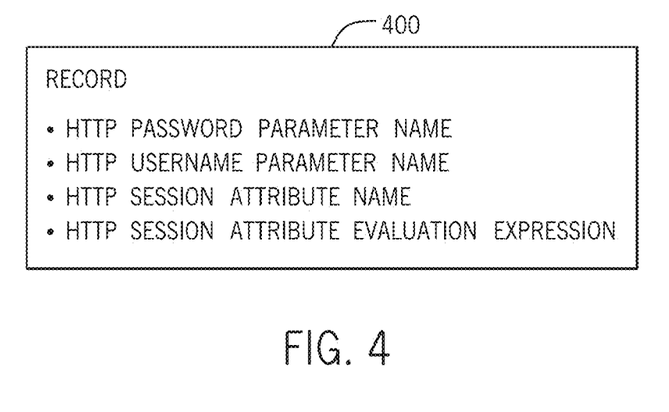
FIG. 4 is a schematic diagram of a record stored in response to detecting a successful authentication attempt, according to some implementations.

Upon this successful detection, the monitoring agent 106 can store a record of HTTP parameter names that the monitoring agent 106 can use in the future to look for credential information. An example of such record 400 is shown in FIG. 4. The record 400 contains the following information: an HTTP password parameter name (this is the string corresponding to the name of the HTTP password parameter, such as "password," and not the value of the password parameter), an HTTP username parameter name (this is the string corresponding to the name of the HTTP username parameter, such as "username," and not the value of the password parameter), an HTTP session attribute name (this is the string identifying the name of the object, such as the "account" object, that contains the credential information), and an HTTP session attribute evaluation expression (this identifies a routine to be invoked to retrieve credential information such as a username and/or password). An example of an HTTP session attribute evaluation expression is "value.getUser( ).getName( )" which indicates that the monitoring agent 106 would first call getUser( ) and then getName( ) on the "account" object to retrieve the credential information. In this way, the fields of a subsequently received "account" object would not have to be searched to find credential information—rather, the foregoing routines can be invoked to retrieve the credential information.

The following describes how an unsuccessful authentication attempt is detected. Note that an unsuccessful authentication attempt can be detected after the first successful authentication has been detected.

After the first successful authentication attempt has been detected for an HTTP session, record 400 is created and therefore the monitoring agent 106 knows the credential information (e.g. username and password) for the HTTP session. A subsequent authentication attempt (due to an authentication request) that does not result in credential information being stored to HTTP session storage is an indication that the subsequent authentication attempt has failed.

In addition to detecting a successful or an unsuccessful authentication attempt, the monitoring agent 106 is also able to detect a logoff event (due to a client logging off an HTTP session). In some implementations, a logoff event is detected if the HTTP session attribute (e.g. "account" object discussed above) used to store account information is removed (set to null). In further implementations, a logoff event is detected if the HTTP session is invalidated.

Figure 5:
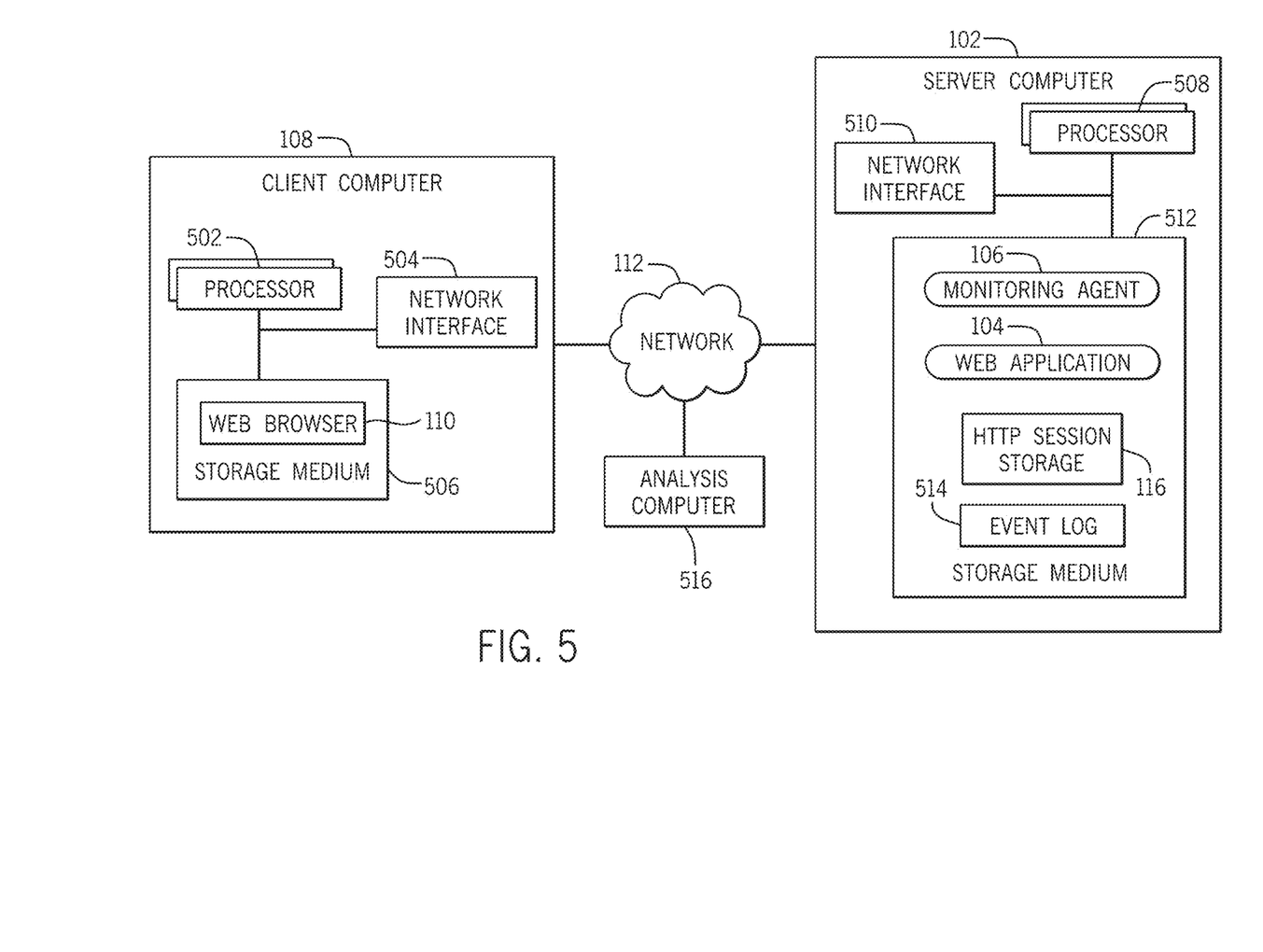
FIG. 5 is a block diagram of another example arrangement that includes a monitoring agent according to some implementations.

FIG. 5 is a block diagram of an example arrangement that includes the client computer 108 and the server computer 102, according to further implementations. The client computer 108 includes one or multiple processors 502, a network interface 504 to allow the client computer 108 to communicate over the network 112, and a storage medium 506 (or storage media) storing the web browser 110 and other information. The web browser 110 is executable one the processor(s) 502.

The server computer 102 includes one or multiple processors 508, a network interface 510 to allow the server computer 102 over the network 112, and a storage medium 512 (or storage media) storing the monitoring agent 106, the web application 104, the HTTP session storage 116, and an event log 514 (to store authentication events detected by the monitoring agent 106). The monitoring agent 106 and the web application 104 are executable on the processor(s) 508.

The event log 514 can be sent by the monitoring agent 106 to an analysis computer 516 to process events in the event log 514. The analysis computer 516 can determine, based on the events, whether security issues are present, whether a system complies with rules, regulations, policies, and so forth, or whether other issues are present.

Examples of information included in the event log 514 that can be sent to the analysis computer 516 include any or some combination of the following: time information (date and time) of an event; Internet Protocol (IP) address of the web browser 110; URL of the authentication request; HTTP request parameters, including a credential parameter; version information of the web browser 110; an identifier of an HTTP session; a result of a logon attempt (whether the logon was successful or not); and other information.

Analyses that can be performed by the analysis computer 516 can include any or some combination of the following: a determination of whether there are shared accounts (such as when authentication attempts from multiple IP addresses use the same credential); a determination of whether there are shared machines (based on multiple authentication attempts from the same IP address); a determination of location discrepancy (such as when a user performs a logon from locations far away from each other within a small period of time); a determination of whether a brute force password attack is being performed (such as when a successful logon occurs after a large number of failed attempts); and other analyses.

More generally, the foregoing analyses are performed by the analysis computer 516 to identify a potential security issue in the system. In other examples, analyses performed by the analysis computer 516 can determine whether the system is compliant with rules, regulations, or policies (such as a determination of whether data is being backed up at specified intervals, whether users are logging off their machines when they leave their machines for an extended time period, and so forth).

Machine-readable instructions of various code described above (including the web browser 110, web application 104, and monitoring agent 106) are loaded for execution on a processor or multiple processors. A processor can include a microprocessor, microcontroller, processor module or subsystem, programmable integrated circuit, programmable gate array, or another control or computing device.

Data and instructions are stored in respective storage devices, such as non-transitory computer-readable or machine-readable storage media (e.g. 506 and 512). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:

receiving, by a program executed in a system comprising a processor, a request from an entity to access a resource;

in response to the request being an authentication request:

performing, by the program, a verification of a credential included in the request, the program granting access to the resource and adding authentication information into a Hypertext Transfer Protocol (HTTP) session storage in response to verifying the credential, and the program not adding the authentication information into the HTTP session storage in response to not verifying the credential;

monitoring, by a monitoring agent executed in the system, information added to the HTTP session storage by the program as part of processing the authentication request;

determining, by the monitoring agent based on the monitoring, whether the authentication information is stored in the HTTP session storage;

indicating, by the monitoring agent, a successful authentication attempt in response to determining that the authentication information is stored in the HTTP session storage; and indicating, by the monitoring agent, an unsuccessful authentication attempt in response to determining that the authentication information is not stored in the HTTP session storage.

2. The method of claim 1, further comprising determining, by the monitoring agent, whether the request is the authentication request by determining whether the request contains a string from among a collection of specified strings.

3. The method of claim 2, wherein determining whether the request contains the string from among the collection of specified strings comprises determining whether a uniform resource locator of the request contains the string from among the collection of specified strings.

4. The method of claim 2, wherein the collection of specified strings includes strings relating to credentials for authenticating a client.

5. The method of claim 1, wherein determining whether the authentication information is stored in the HTTP session storage comprises determining whether the credential is stored in the HTTP session storage.

6. The method of claim 5, wherein the credential includes a username.

7. The method of claim 1, wherein monitoring the information comprises monitoring an application programming interface associated with an HTTP session for which the HTTP session storage stores attributes of the HTTP session, the application programming interface used for storing an attribute comprising the authentication information into the HTTP session storage.

8. The method of claim 1, further comprising:
detecting, by the system, a logoff event.

9. The method of claim 1, further comprising storing, by the monitoring agent, a record in an event log, the record containing the credential in response to determining that the authentication information is stored in the HTTP session storage.

10. The method of claim 9, further comprising:
detecting, by the system based on the event log, a security issue in the system.

11. The method of claim 9, further comprising:
detecting, by the system based on the event log, that the system fails to comply with a rule or policy.

12. An article comprising at least one non-transitory machine-readable storage medium storing instructions that upon execution cause a system to:
receive, by a program, a request from an entity to access a resource;
in response to the request being an authentication request:
perform, by the program, a verification of a credential included in the request, the program to grant access to the resource and add authentication information into a Hypertext Transfer Protocol (HTTP) session storage in response to verifying the credential, and the program to not add the authentication information into the HTTP session storage in response to not verifying the credential;
monitor, by a monitoring agent, information added to the HTTP session storage by the program as part of processing the authentication request;
determine, by the monitoring agent based on the monitoring, whether the authentication information is stored in the HTTP session storage;
indicate, by the monitoring agent, a successful authentication attempt in response to determining that the authentication information is stored in the HTTP session storage; and
indicate, by the monitoring agent, an unsuccessful authentication attempt in response to determining that the authentication information is not stored in the HTTP session storage.

13. The article of claim 12, wherein the instructions upon execution cause the system to further:
analyze a log including events relating to successful authentication attempts and unsuccessful authentication attempts; and
detect, based on the analyzing, a security issue in the system.

14. The article of claim 12, wherein monitoring the information comprises monitoring the information associated with a custom programming interface to a web application.

15. The article of claim 12, wherein the resource comprises a web application, and the authentication request is a request to log into the web application.

16. The article of claim 12, wherein the authentication information added into the HTTP session storage by the program includes the credential.

17. A system comprising:
a processor; and
a non-transitory storage medium storing a program executable on the processor to:
receive a request from a client computer to access a web application, and
in response to the request being an authentication request, perform a verification of a credential included in the request, the program to grant access to the web application and add authentication information into a Hypertext Transfer Protocol (HTTP) session storage in response to verifying the credential, and the program to not add the authentication information into the HTTP session storage in response to not verifying the credential;
wherein the non-transitory storage medium further stores a monitoring agent executable on the processor to:
determine whether the request is the authentication request by determining whether a uniform resource locator of the request contains a string from among a collection of specified strings,
in response to determining that the request is the authentication request, monitor information added to the HTTP session storage by the program as part of processing the authentication request in an HTTP session between the client computer and the web application,
determine, based on the monitoring, whether the authentication information is stored in the HTTP session storage,
determine, based on whether the authentication information is stored in the HTTP session storage, whether the authentication request is a successful authentication attempt or an unsuccessful authentication attempt, and determine, based on events relating to successful authentication attempts and unsuccessful authentication attempts, whether a security issue is present in the system.

18. The system of claim 17, wherein the determining of whether the security issue is present is based on one or a combination of time information of an event; an Internet Protocol (IP) address; a uniform resource locator of the request; an HTTP request parameter; version information of a web browser at the client computer; an identifier of an HTTP session; and a result of an authentication attempt.

19. The system of claim 17, wherein the authentication information added into the HTTP session storage by the program includes the credential.

* * * * *